United States Patent [19]

Goodwin, III

[11] Patent Number: 5,854,474
[45] Date of Patent: Dec. 29, 1998

[54] ELECTRONIC SIGN HAVING AUTOMATIC PRICE DISPLAY

[75] Inventor: John C. Goodwin, III, Suwanee, Ga.

[73] Assignee: NCR Corporation, Dayton, Ohio

[21] Appl. No.: 708,994

[22] Filed: Sep. 6, 1996

[51] Int. Cl.⁶ .................................................. G06K 15/00
[52] U.S. Cl. ........................................... 235/383; 235/375
[58] Field of Search ...................... 235/375, 383

[56] References Cited

U.S. PATENT DOCUMENTS

| | | |
|---|---|---|
| 4,002,886 | 1/1977 | Sundelin . |
| 4,500,880 | 2/1985 | Gomersall et al. ............... 340/825.35 |
| 4,654,514 | 3/1987 | Watson et al. ........................ 235/383 |
| 4,825,058 | 4/1989 | Poland .................................. 235/472 |
| 5,111,196 | 5/1992 | Hunt .................................. 340/825.35 |
| 5,172,314 | 12/1992 | Poland et al. ........................ 364/401 |
| 5,448,226 | 9/1995 | Failing, Jr. et al. ............... 340/825.35 |
| 5,504,322 | 4/1996 | Pavlidis et al. ...................... 235/494 |
| 5,504,475 | 4/1996 | Houdou et al. .................... 340/825.35 |

FOREIGN PATENT DOCUMENTS

WO9423381  10/1994  WIPO .

*Primary Examiner*—Harold Pitts
*Attorney, Agent, or Firm*—Paul W. Martin

[57] ABSTRACT

An electronic sign which includes a number of two-dimensional (2-D) bar code readers which read a two-dimensional bar code label on a back side of a corresponding number of item description cards. The two-dimensional bar code labels are situated adjacent the two-dimensional bar code readers when the item description cards are installed. Each two-dimensional bar code label contains price data for the item associated with the item listed on the item description card. The two-dimensional bar code label may additionally contain promotional data. Each two-dimensional bar code reader is activated by a switch only when necessary to read the two-dimensional bar code label. The switch is preferably activated manually.

7 Claims, 3 Drawing Sheets

ELECTRONIC SIGN HAVING AUTOMATIC PRICE DISPLAY

CROSS-REFERENCE TO RELATED APPLICATION

The present invention is related to the following commonly assigned and co-pending U.S. application:

"Electronic Price Label Having Two-dimensional Bar Code Reader", filed Sep. 21, 1995, invented by Goodwin, and having a Ser. No. 08/531,809.

BACKGROUND OF THE INVENTION

The present invention relates to electronic signage, and more specifically to an electronic sign having automatic price display.

Fast food restaurants, auto repair shops, and other retail and service establishments typically provide signs that contain a list of items, including services, available for purchase and a corresponding price. Such signs require item descriptions and prices to be changed manually, with no assurance that the price mounted adjacent an item is the correct price.

Therefore, it would be desirable to provide a sign that automatically displays a correct price for an item when a description of the item is mounted to the sign.

SUMMARY OF THE INVENTION

In accordance with the teachings of the present invention, an electronic sign having automatic price display is provided.

The electronic sign includes a number of two-dimensional (2-D) bar code readers which read a two-dimensional bar code label on a back side of a corresponding number of item description cards. The two-dimensional bar code labels are situated adjacent the two-dimensional bar code readers when the item description cards are installed. Each two-dimensional bar code label contains price data for the item associated with the item listed on the item description card. The two-dimensional bar code label may additionally contain promotional data. Each two-dimensional bar code reader is activated by a switch only when necessary to read the two-dimensional bar code label. The switch is preferably activated manually.

It is accordingly an object of the present invention to provide an electronic sign having automatic price display.

It is another object of the present invention to provide an electronic sign having automatic price display which reads a two-dimensional bar code label on the back side of an item description card.

It is another object of the present invention to provide an electronic sign having automatic price display which is selectively activated to read a two-dimensional bar code label on the back side of an item description card.

It is another object of the present invention to provide an electronic sign having automatic price display which can display price and promotional data contained within a two-dimensional bar code label on the back side of an item description card.

BRIEF DESCRIPTION OF THE DRAWINGS

Additional benefits and advantages of the present invention will become apparent to those skilled in the art to which this invention relates from the subsequent description of the preferred embodiments and the appended claims, taken in conjunction with the accompanying drawings, in which:

DETAILED DESCRIPTION OF THE PREFERRED EMBODIMENT

Figure 1:
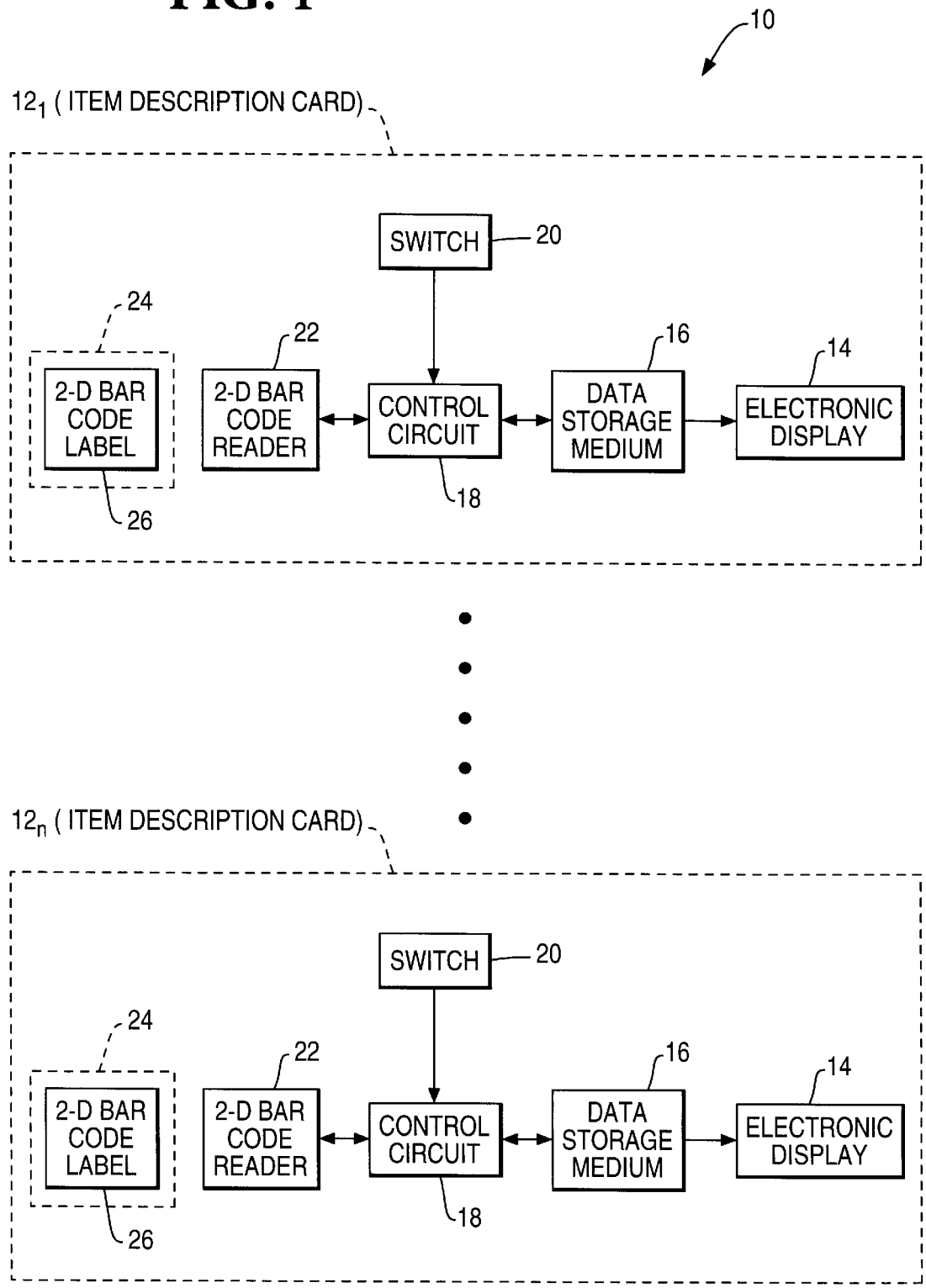
FIG. 1 is a block diagram of an electronic sign of the present invention.

Referring now to FIG. 1, electronic sign 10 primarily includes a number of sign circuits, shown here as $12_1$–$12_n$, each including electronic display 14, data storage medium 16, control circuit 18, switch 20, and two-dimensional (2-D) bar code reader 22.

Electronic sign 10 is typically attached to a wall or some other mounting structure. For example, in a fast food restaurant, electronic sign 10 may be mounted in such places as a wall behind the order counter or on a platform adjacent a drive-through lane.

Electronic display 14 is preferably an LED or LCD display, but other types of displays are also suitable.

Data storage medium 14 is preferably a memory register for storing data to be displayed by electronic display 14. Such data includes price, and in some cases, other information, such as availability and promotional information.

Control circuit 18 controls operation of the sign circuit 12. Any available microcontroller or processor is suitable for this purpose.

Switch 20 signals control circuit 18 to read bar code label 26 on the back of item identification card 24. Switch 20 is preferably a manually-operated switch, such as a push-button switch.

2-D bar code reader 22 is preferably any known 2-D bar code reader. 2-D bar code reader 22 is preferably off until activated.

Item description card 24 has a description of an item on a front side and 2-D bar code label 26 on a back side. 2-D bar code label may be printed on the back of an item description card or otherwise suitably attached after created. 2-D bar code label contains the information for display by electronic display 14.

Figure 2:
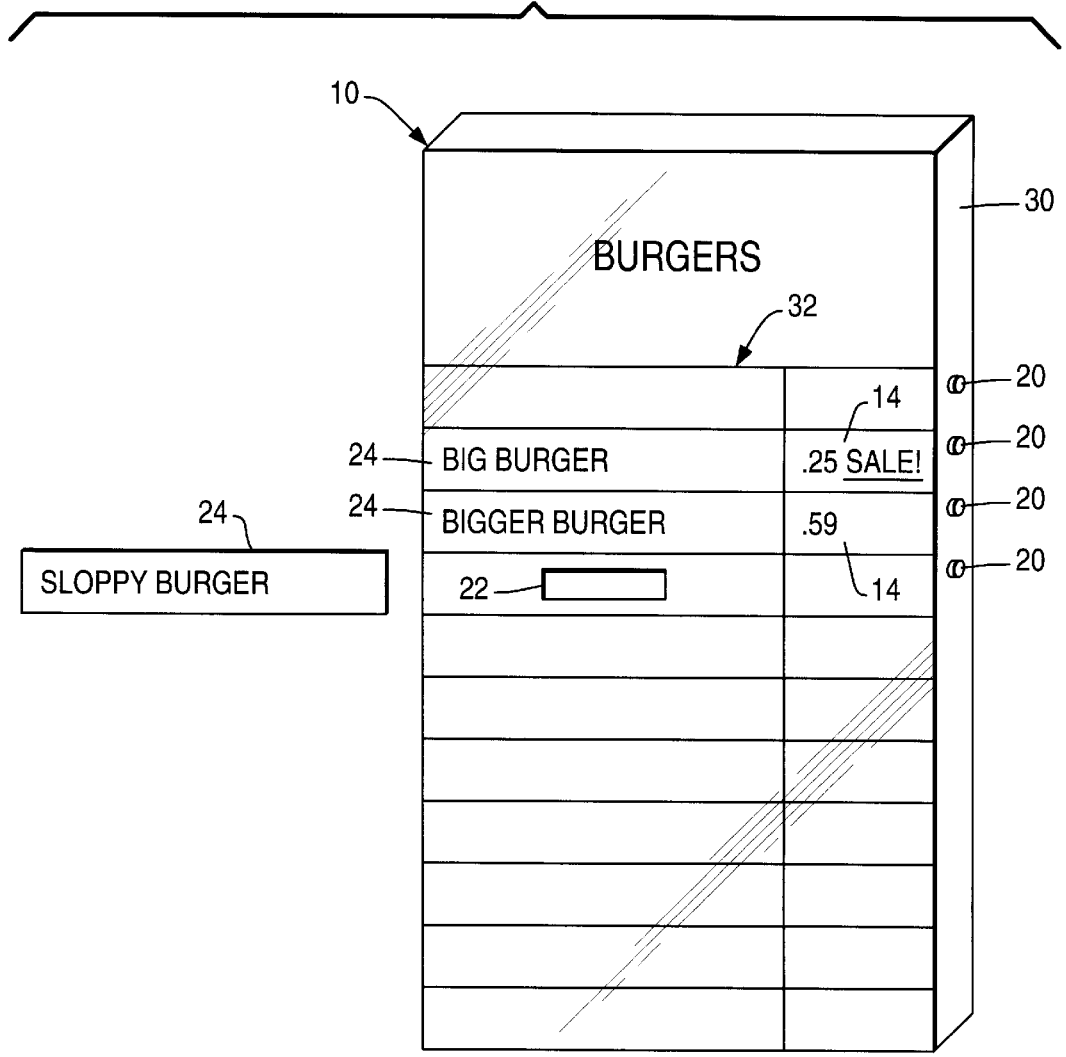
FIG. 2 is a perspective view of the electronic sign.

Turning now to FIG. 2, electronic sign 10 is shown in more detail and includes housing 30. Housing 30 includes sign slots 32 which each contain a 2-D bar code reader 26 and an electronic display 14. The aperture or image input surface, as appropriate, of 2-D bar code reader 26 is flush with the surface of each sign slot 32.

Sign slots and item identification cards 24 may be arranged in any suitable fashion, including one over the other in menu format.

Item identification cards may be retained with sign slots 32 by any suitable means, such as mechanical detents or adhesives. Item identification cards may include any combination of lettering and graphics on their front sides to identify an item, including a service. Some item identification cards may also be used as menu separators, with their front and back sides both being blank.

Figure 3:
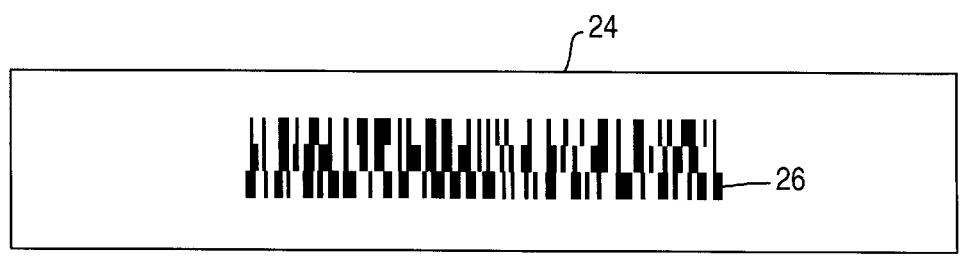
FIG. 3 is a back view of an item identification card showing a 2-D bar code label.

Turning now to FIG. 3, the back side 34 of a sample item identification card 24 is shown with its 2-D bar code label 26.

2-D bar code label 26 is aligned over 2-D bar code reader 22.

Figure 4:
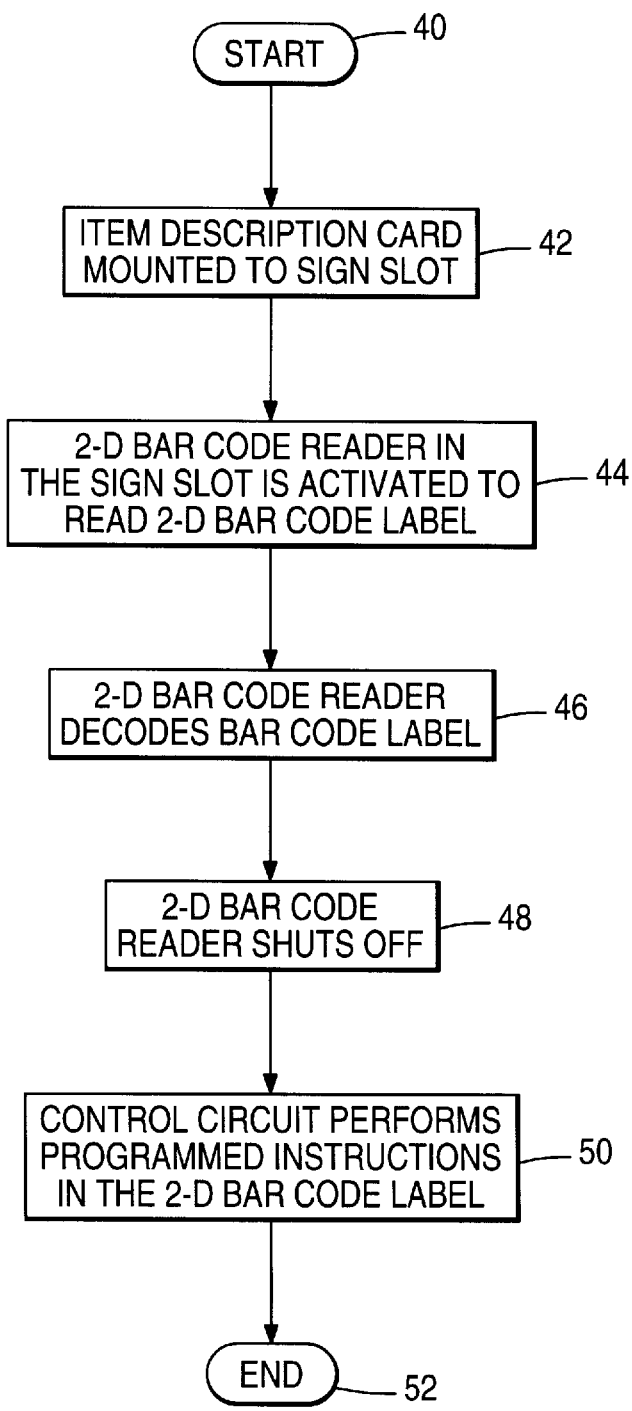
FIG. 4 is a flow diagram illustrating the operation of the electronic sign and its bar code readers.

Turning now to FIG. 4, the operation of electronic sign 10 is illustrated in more detail beginning with START 40.

In step 42, item identification card 24 is mounted to sign slot 32.

In step 44, 2-D bar code reader 22 is activated by switch 20 to read 2-D bar code label 26.

In step 46, 2-D bar code reader 22 decodes 2-D bar code label 26.

In step 48, 2-D bar code reader 22 shuts off.

In step 50, control circuit 18 reads the data within 2-D bar code label 26 and performs the programmed instructions in 2-D bar code label 26 and the method ends in step 52.

Although the present invention has been described with particular reference to certain preferred embodiments thereof, variations and modifications of the present invention can be effected within the spirit and scope of the following claims.

What is claimed is:

1. An electronic sign comprising:

a plurality of item description cards which together form a menu, wherein each item description card includes an item description on a front side and a two-dimensional bar code label containing price information on a back side;

a housing containing a plurality of adjacent slots which retain the item description cards;

wherein each slot contains a two-dimensional bar code reader, a memory for storing the price information from the item identification card, and a display for displaying the price information; and a plurality of switches, one for each slot, for activating the two-dimensional bar code readers to read the two-dimensional bar code labels on the item description cards and store the price information in the memory, and for causing the displays to display the price information in the two-dimensional bar code labels.

2. The electronic sign as recited in claim 1, wherein the switch is activated manually.

3. The electronic sign as recited in claim 1, further comprising:

a control circuit coupled to each two-dimensional bar code reader for activating the two-dimensional bar code reader upon activation of the switch.

4. The electronic sign as recited in claim 1, wherein the slots are arranged in rows on top of each other.

5. A method of updating a price of an item in a sign comprising the steps of:

activating a switch in the sign which controls a two-dimensional bar code reader;

decoding a two-dimensional bar code label on a back side of an item identification card for the item by the two-dimensional bar code reader to obtain a new price for the item contained within the two-dimensional bar code label, wherein the item identification card also includes a front side having a legible description of the item;

storing the new price in a memory within the sign by a control circuit in response to the decoding step; and displaying the new price by a display which is adjacent to the item identification card.

6. The method as recited in claim 5, wherein the two-dimensional bar code label also contains a promotional message and wherein the method further comprises the steps of:

decoding the two-dimensional bar code label to obtain a promotional message from the two-dimensional bar code label;

storing the promotional message in the memory within the sign by the control circuit; and displaying the promotional message by the display.

7. The electronic sign as recited in claim 1, wherein the two-dimensional bar code labels of some of the item identification cards also contain promotional information to be displayed by corresponding displays.

* * * * *